Dec. 19, 1922.
J. W. BROOKS.
VALVE.
FILED JAN. 5, 1921.
1,439,062.
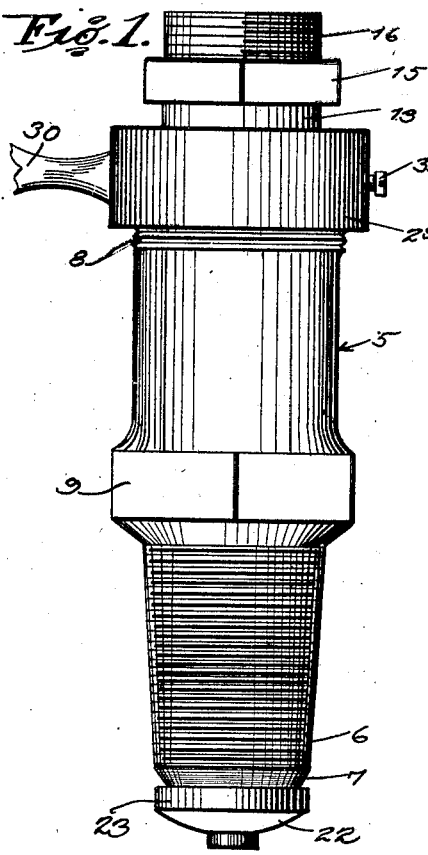
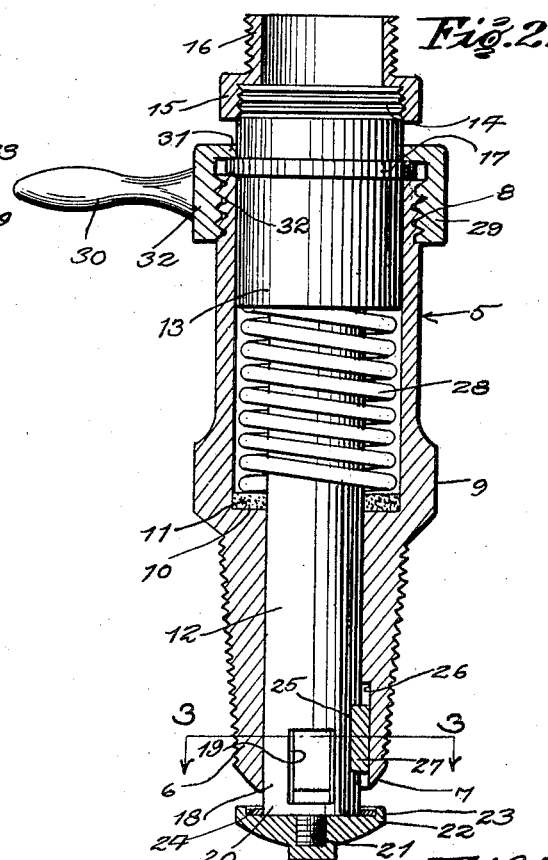
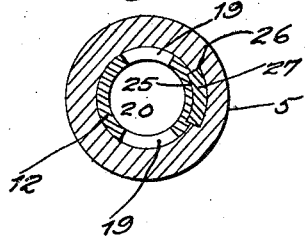
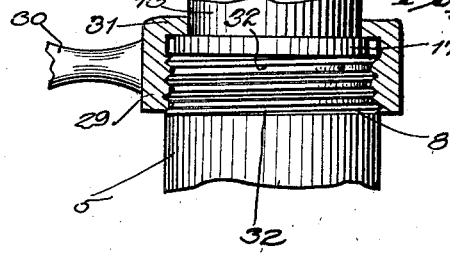
James W. Brooks.
INVENTOR.
BY Watson E. Coleman
ATTORNEY.

Patented Dec. 19, 1922.

1,439,062

UNITED STATES PATENT OFFICE.

JAMES WALTER BROOKS, OF BALTIMORE, MARYLAND.

VALVE.

Application filed January 5, 1921. Serial No. 435,208.

*To all whom it may concern:*

Be it known that JAMES WALTER BROOKS, a citizen of the United States, residing at Baltimore, in the county of Baltimore City and State of Maryland, has invented certain new and useful Improvements in Valves, of which the following is a specification, reference being had to the accompanying drawings.

This invention relates to valves and has for its object to provide a valve adapted for use in connection with a hose or like conduit and arranged to automatically shut off the supply of liquid.

Another object of the invention is to provide a valve having manually operable means for opening the valve and automatic means for closing the valve, said automatic means being controlled by the manually operable means when the valve is in its open position.

Another object of the invention is to provide a valve of this character including means for opening the valve and means for closing the valve, said means being operable independently of each other.

A still further object of the invention is to provide a valve of this character wherein the liquid passes through the valve stem and does not come in contact with the operating parts of the valve.

A still further object of the invention is to provide a valve of this character wherein the automatic closing means cooperates with the manually operable means to prevent accidental movement of the manually operable means.

With the above and other objects in view, the invention consists in the improved construction and arrangement of parts to be hereinafter more particularly described, fully claimed and illustrated in the accompanying drawings, in which:—

Figure 1 is a vertical elevation of the valve constructed in accordance with an embodiment of the invention, Figure 2 is a longitudinal sectional view showing the valve in its open position, Figure 3 is a section taken on the line 3—3 of Figure 2, Figure 4 is a detail view of one end of the valve casing showing the groove of the set screw.

Referring to the drawings, 5 designates a tubular casing, the end 6 of the casing being reduced to provide a valve seat 7. The exterior portion of the end 6 is threaded, to permit the valve to be connected to the pressure line, while the end 8 is also threaded, the purpose of which will be hereinafter described.

The exterior intermediate portion of the tubular member 5 is provided with a hexagonal collar 9 by means of which the valve casing may be applied to the pressure line with the use of a wrench.

The interior of the casing 5, from the intermediate portion thereof to the end 8 is enlarged to provide a shoulder 10 adapted to support a washer 11. Slidable within the casing 5 is a valve stem 12 having its end 13 enlarged and threaded as at 14 for the reception of the coupling 15, by means of which the hose is attached to the valve stem. The coupling 15 is provided with a reduced portion 16 adapted to receive a hose or like conduit. Disposed in spaced relation to the threaded portion 14 of the enlargement 13 is a collar 17, adapted at times to engage the extremity of the end portion 8 to limit movement of the valve stem 12. The enlarged portion 13 is snugly mounted within the enlargement of the casing 5, while the valve stem 12 projects through the smaller passage of the tubular casing to the end 6 thereof. The valve stem 12 is hollow, to permit the passage of liquid therethrough, the end portion 18 of the stem being provided with opposed outlet openings 19 which are closed by means of the walls of the tubular valve casing.

The extremity 20 of the stem is closed and provided with an extension 21 which is threaded for the reception of a valve cap 22. The cap 22 is provided with an annular flange 23 adapted to be disposed in alignment with the extremity of the end 6 of the casing 5 and to surround the exterior portion of the valve seat 7. A washer 24 is carried by the valve cap 22 and adapted to engage the valve seat 7 when the valve is in its closed position. The end portion 18 of the valve stem is provided with a groove 25 which registers with the groove 26 provided in the inner surface of the end 6 of the valve casing. These grooves are intended to receive a key 27 to prevent rotary movement of the valve stem relative to the valve casing. In order to permit the valve to automatically close, a spring 28 is disposed on the valve stem within the enlarged portion of the valve casing. One end of the spring is adapted to engage the enlarged portion 13, while the other end of the spring is adapted to force the washer 14 in engagement with the shoulder 10 so as to prevent leakage of the valve.

An adjusting collar 29, is mounted on the end 8 of the casing, said collar including a handle 30 by means of which the collar may be rotated longitudinally of the casing. This collar has one end portion thereof extended inwardly to provide an annular flange 31 which at times engages the collar 17 of the valve stem, to cause movement of the valve stem in one direction.

The flange 31 of the member 29 is normally disposed in spaced relation to the extremity of the end 8 of the casing 5, through the medium of the spring 28. The threaded end portion 8 of the casing 5 is also provided with a groove 32 adapted to receive a set screw 33 carried by the collar 29, the set screw being adapted to prevent accidental disengagement of the collar from the casing 5. The groove 32 is formed according to the threads of the end 8 so that rotary movement of the collar 29 will permit the collar to move longitudinally of the casing and with it the screw. The groove however, at the extremity of the end 8, is circular so that it is impossible for the screw to pass beyond the extremity of the end portion 8.

In use, the threaded end portion 6 of the valve casing 5 is connected to the pressure line, and the hose or like conduit connected to the coupling 15. It is of course, obvious that the spring 28 constantly urges the valve cap 22 to its closed position and is assisted in this operation through the pressure of the liquid. When it is desired to discharge liquid from the hose, the handle member 30 is rotated a short distance so as to force the flange 17 into engagement with the end of the casing 5 as shown in Figure 2, thereby opening the valve. When the handle member 30 is returned to its former position, the valve then acts automatically through the medium of the spring to set off the supply of liquid by forcing the valve cap into engagement with the valve seat.

From the foregoing it will be readily seen that this invention provides a novel form of valve so constructed that the parts may be readily disassembled if necessary. In addition to this it is leak-proof as the valve does not depend on the collar 29 to close the valve, but closes automatically through the medium of the spring, which also firmly urges the valve into engagement with the valve seat thereby preventing leakage. In addition to this, the constant pressure of the spring 28 against the enlarged portion 13, cooperates with the flange 17 to prevent accidental rotation of the collar 29. Furthermore, none of the liquid passes between the casing and the valve stem, but through the valve stem so that the flow is not interrupted by the various parts of the valve and as the construction of the valve is simple it will last indefinitely

What is claimed is:—

A valve of the character described comprising a tubular casing having one end beveled to provide a valve seat, one end portion of the bore of the casing being enlarged, the wall of the opposite end portion of the bore of the casing having a longitudinally extending groove, a tubular valve stem slidable in said casing, a key carried by the valve stem, said key being slidable in the groove of the tubular member, the side walls of the stem adjacent one end of the stem having ports, a valve carried by said end of the stem adjacent the ports, the opposite end portion of the valve stem being enlarged and slidable within the handle portion of the bore, a spring surrounding the valve stem within the enlarged portion of the bore for normally holding the valve closed, said spring being also disposed between the end of the enlarged portion of the stem and the end of the enlarged portion of the bore, and actuating means operatively connected to the casing and the valve stem.

In testimony whereof I hereunto affix my signature.

JAMES WALTER BROOKS.